Nov. 18, 1952　　　　L. R. MANSELL　　　　2,618,046
LENGTH CONTROL APPARATUS

Filed Dec. 9, 1947　　　　　　　　　　　　2 SHEETS—SHEET 1

INVENTOR.
LELAND R. MANSELL
BY George N. Hibbert
ATTORNEY.

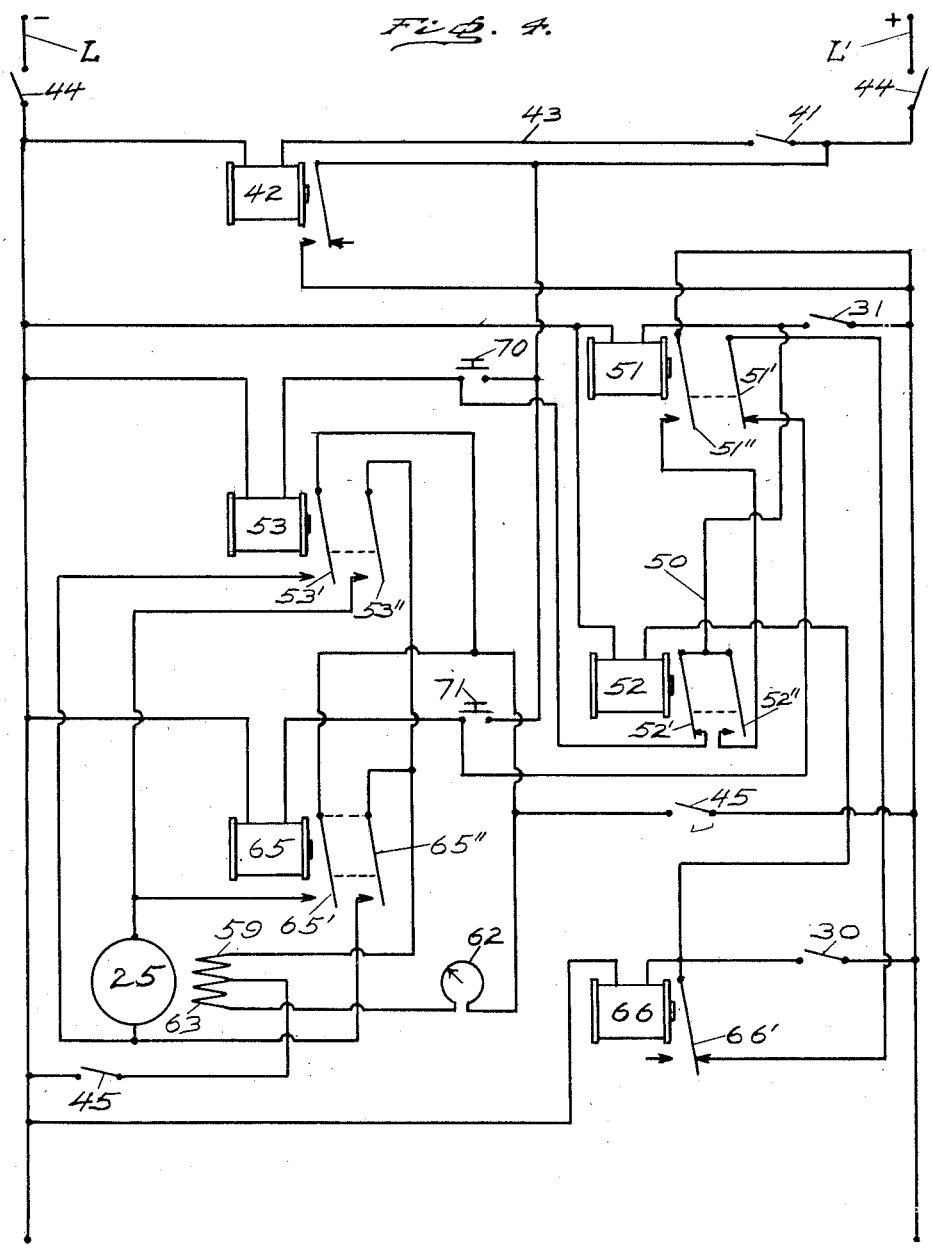

Patented Nov. 18, 1952

2,618,046

UNITED STATES PATENT OFFICE 2,618,046

LENGTH CONTROL APPARATUS

Leland R. Mansell, Poland, Ohio

Application December 9, 1947, Serial No. 790,516

13 Claims. (Cl. 29—69)

This invention is directed to the provision of apparatus for insuring cutting moving stock such as pipe, tubing, rods and the like into pieces of substantially predetermined length as the stock is continuously generated in a continuous mill or other apparatus, the invention also including further objects and novel features of design, construction and arrangement as will hereinafter more fully appear.

As it is particularly adapted for use in connection with the severing of butt weld pipe after its formation in a continuous butt weld mill, I shall describe the invention more especially when utilized for that purpose but not by way of limitation or restriction thereto as it may be employed advantageously for many other purposes and in connection with other kinds of stock if desired. It will moreover be understood that the term "pipe" is herein used in a generic sense to indicate any elongated generally like material such as rods or tubes as well as the class of goods specifically known as pipe.

Butt weld pipe as produced on a continuous mill is delivered from the latter at high speed and is usually cut into approximate lengths at a point relatively close to that of its exit from the mill by some appropriate mechanism such as the flying saw disclosed in U. S. Patent 1,946,926, granted February 13, 1934 to J. M. Barton, to which reference may be had for a detailed description of the saw and its actuating mechanism. Speaking generally, however, such a saw is positioned adjacent the line of travel of the pipe upon a table movable parallel thereto and electrically controlled means are provided for moving it from a position of rest until it attains approximately the speed of the pipe at which time the saw is forced against the latter to sever it, after which the table is brought to rest and then returned to its first position preparatory to being again actuated to cut off the succeeding length of pipe. The motion of the table is initiated by a switch controlling the circuit which energizes a magnetic clutch operative when engaged to cause the saw table to be activated from the main drive mechanism of the mill, and theoretically, such switch could be set to close the circuit at predetermined fixed time intervals as at constant pipe speed this would necessarily result in the pipe being cut into a plurality of sections of the desired length of, say, 20 feet. In practice, however, unavoidable variations in operating conditions materially affect the length of the pieces consecutively cut in this manner so that desirable low length tolerances cannot with any certainty be obtained with a given setting of the switch interval. Thus, for example, slight changes in the speed of the mill, in the temperature of the furnace in which the skelp is heated, or in the thickness of the skelp itself, either alone or in combination, change the velocity at which the pipe emerges from the mill and a saw activated at fixed intervals of time would therefore cut the pipe into longer sections when the velocity of the pipe is high and shorter ones when it is low. As disclosed in said patent, however, a flag switch may be employed for controlling the saw activating circuit but as the time lag between actuation of the flag switch by the leading end of the pipe and the operation of the saw upon it is constant, resetting of the position of the flag switch is required from time to time in an effort to effect the requisite compensation. But such resetting, if and when made, is necessarily in accordance with the judgment of the operator and it results that out of, say 10,000 pieces of pipe, many are too short and others to long because following a change in operating conditions either the flag switch was not properly readjusted or was not readjusted at all.

In the control system disclosed and claimed in U. S. Patent 2,395,562, granted to me February 26, 1946, I provide means whereby the flag switch controlling the operation of the saw is automatically shifted longitudinally of the pipe in one direction or the other to compensate for changes in operating conditions thereby insuring that a series of the severed pipes will be substantially of the same length irrespective of such changes, said means being further automatically operative to properly adjust the position of the flag switch when the length of the sections is to be increased or decreased, but that system requires the employment of two flag switches in the path of the pipe and with increasing speeds of pipe production in continuous weld mills for example, where average speeds of more than 500' per minute and even maximum speeds up to about 1000' per minute may be encountered, the use of two flag switches is undesirable as enhancing more frequent occurrence of cobbles or escape of the pipe from the pipe trough through the pipe having to contact two switches instead of but one. Systems using but one such switch, however, as pointed out in my said Patent 2,395,562, heretofore have been incapable of producing substantial uniformity in the length of the pieces of pipe as they are cut, and the present invention is therefore directed to the provision of length control apparatus in which but one flag switch is employed but which is effective to compensate accurately for changing conditions and therefore to bring about accurate cutting to substantially any predetermined uniform length of any number of pieces or pipe sections from a continuous length of pipe as it issues from the mill. In its elimination of a second flag switch and in other respects it therefore consitutes an improvement on my said prior invention and is of especial utility in mills in which the pipe or other article to be severed into lengths is generated at very high speed.

In the accompanying drawings, to which reference may now be had,

Fig. 4 is a schematic diagram of the electrical control system preferably employed.

Figure 1:
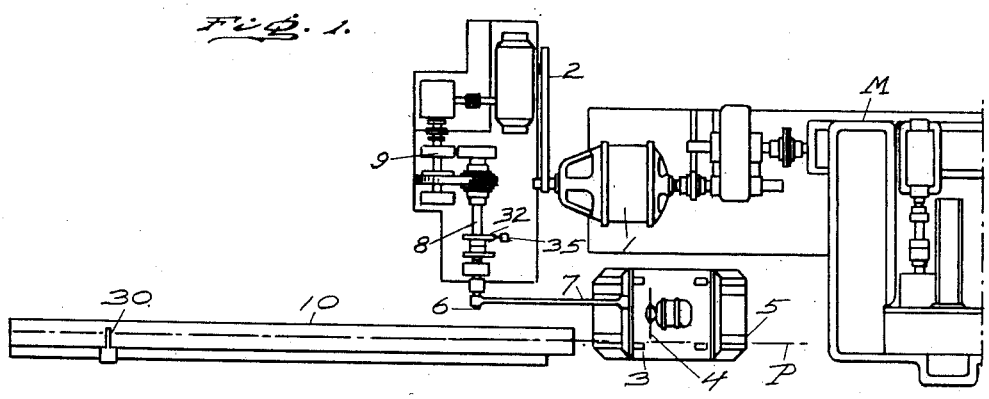
Fig. 1 is a substantially diagrammatic plan view of a portion of a continuous butt weld pipe mill and flying saw assembly of conventional design in which apparatus embodying the invention is incorporated.
Figure 2:
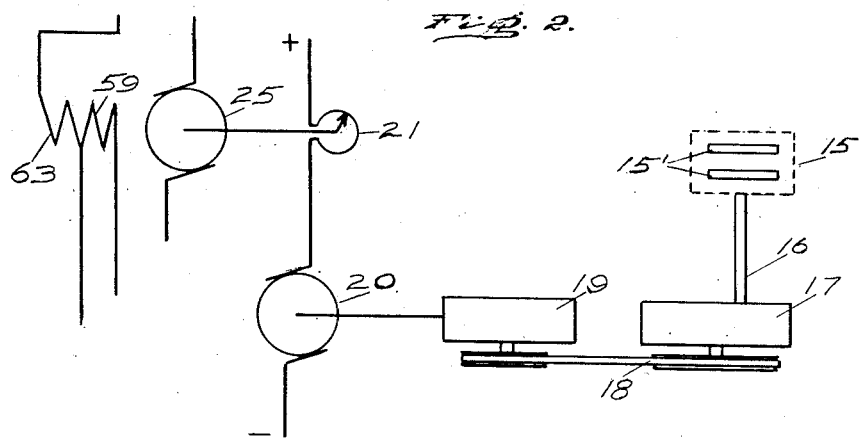
Fig. 2 is an enlarged diagrammatic representation of certain of the controls incorporated in said apparatus.
Figure 3:
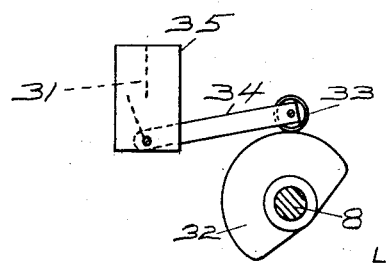
Fig. 3 is a further enlarged end elevation of one of the switches utilized.

To facilitate a proper understanding of the invention I shall first describe certain mechanical details thereof as shown in Figs. 1–3 inclusive and then the preferred electrical circuits and connections schematically illustrated in Fig. 4. Thus in Fig. 1 M designates generally a continuous butt weld pipe mill of any suitable construction which may be driven by a motor 1 which also, through the medium of a belt 2, supplies power for actuating the sliding table 3 on which the motor driven circular flying saw 4 is mounted. This table is arranged for reciprocation parallel to the path of the pipe on a base 5 through the medium of a crank 6 and pitman 7, the shaft 8 on which the crank is mounted being controlled by an electrically actuated clutch 9 by which it can be connected and disconnected through reduction gearing to motor 1. The pipe as it emerges from the mill moves past the saw to a conveyor 10 of suitable construction for carrying it in a direction away from the mill for ultimate reception on a cooling table or some other apparatus (not shown), and thus when the clutch is engaged, with table 3 at that end of its travel nearest the mill, the table will be drawn with increasing speed in the direction in which the pipe travels along the path P, designated in dot and dash line, until it attains approximately the speed of the pipe at which time the saw is caused to move transversely so as to sever it and is then retracted as the table comes to rest at the opposite end of its stroke from which point the table is returned during the next half revolution of shaft 8 to initial position preparatory to cutting off the next piece of pipe.

The operation of the magnetic clutch and hence the activation of the saw table is controlled by a continuously operating drum limit switch 15 in such manner as to cause the clutch to engage at properly timed intervals for cutting the pipe to the desired length and it is disengaged by suitable means (not shown) when the table has been restored to starting position each time after the pipe has been cut, the details of operation of the saw and table upon engagement of the clutch being more fully explained in said Patent 1,946,926, which illustrates one of many known arrangements for coordinating the action of these units.

In accordance with the present invention, which is thus primarily directed to automatically controlling the interval between successive engagements of the clutch to compensate for changes in the rate of speed at which the pipe issues from the mill, instead of employing a flag switch to be engaged by the pipe end to energize the clutch operating mechanism, the contacts of the continuously operating drum switch 15 are connected with the clutch control circuits so as to cause the clutch to engage at a predetermined angular position of the switch drum during each revolution of the latter. As many kinds of known motor driven drum switches are capable of performing this function the specific details of switch 15 are not illustrated and form no part of the invention which is concerned more directly with control of the speed at which the switch operates in effecting the desired coordination between its rotation and the speed of the pipe issuing from the mill.

The drum switch may be driven by a shaft 16 from a variable speed reducer 17 in turn driven by belt 18 from another speed reducer 19 connected with the shaft of a variable speed motor 20 the speed of which is controlled by a rheostat 21 in its energizing circuit. This rheostat is connected with and operated by a compound-wound reversible direct current motor 25 which when energized thus adjusts rheostat 21 to cause an increase or decrease in the speed of motor 20, depending on the direction of rotation of motor 25. While in practice it is preferable to interpose speed reducing connections between the shaft of the latter and the variable contact of rheostat 21, showing of such connections has been omitted from the drawing as their functions are well understood and their specific structure forms no part of the invention. They should, however, insure substantially immediate response in changing the effective resistance of rheostat 21 whenever motor 25 is energized and the extent of such change and hence of the resultant change in the speed of motor 20 should always be directly proportional to the time during which motor 25 is in operation and correspond in direction to that of rotation of the motor shaft. Thus while switch motor 20 operates continuously and always in the same direction when the mill as a whole is in operation and causes clutch 9 to become engaged at intervals the timing of which, through drum switch 15, depends on the speed of motor 20, the speed controlling motor 25 functions only intermittently and may operate in either direction depending on the nature of the change required in the speed of motor 20 to compensate for a change in the rate of production of pipe by the mill, to which rate the energization and direction of motor 25 are directly correlated by means now to be described.

These means comprise a single flag switch 30 interposed in the path of the pipe and as indicated in Fig. 1 adapted to be engaged by the successive leading ends of the pipes as they move along conveyor 10, the flag switch completing a circuit through its contacts while it is engaged and opening it automatically as each cut-off section of the pipe moves beyond the switch and before the succeeding pipe end has reached it. It is of course understood that conveyor 10 includes means for carrying the pipe sections, after they have been severed by the saw, away from the mill at a rate faster than that at which the pipe issues from the mill so the trailing end of one pipe section reaches and passes beyond flag switch appreciably before the leading end of the succeeding section reaches it and normally before the latter section has been severed by the saw. The flag switch is adjustable along conveyor 10 since its position directly determines the length of the pipe sections cut by the saw; when it is moved toward or away from the saw and mill and then clamped in fixed position shorter or longer sections are thereafter produced.

Correlated with the circuit controlled by flag switch 30 is a cam operated switch 31, actuated by a cam 32 on shaft 8 through cam follower 33 and arm 34 pivoted in a housing 35 enclosing switch 31, and these two switches 30, 31 are the primary controls for the circuits schematically represented in Fig. 4 which, among other things, determine the direction and duration of the energization of motor 25 and their effect will now be more fully described with reference to that figure.

These circuits are energized conveniently at 250 v. D. C. from main feed lines L, L', under the control of an operator's switch 41 which energizes a relay 42 through lead 43, when line switches 44, motor switches 45 and operator's switch 41 are closed. If now it be assumed that flag switch 30 is set at a fixed position along conveyor 10 corresponding to the desired length of the pipe sections to be cut, that cam 32 is adjusted so it closes cam switch 31 simultaneously with the closing of flag switch 30 when the latter has been closed by a section of pipe cut or being cut to exactly the desired length and that motor 20 is operating at precisely the requisite speed to bring the saw into play at the proper intervals for cutting the pipe sections to that length, we attain that I term the "ideal" condition under which no change in that speed is required and motor 25 should therefore remain deenergized.

Now when flag switch 30 and cam switch 31 are open (Fig. 4) relays 51, 52 respectively in circuit with them are deenergized and no effective current flows through their contacts 51', 51'', 52', 52'', and when the switches close simultaneously the same condition obtains save that the relays are energized and their contacts shifted. When cam switch 31 thereafter opens, switch 30 keeps relay 51 energized through a lead 50 and contacts 51'', 52'' but no other effect is produced and cam 32 is therefore designed to open switch 31 appreciably before the trailing end of a severed pipe section can pass flag switch 30. The contacts of relays 51, 52 are so connected, however, that when either of these relays alone is energized the armature of motor 25 is also energized in one direction or the other depending on which relay is so energized.

Now when the mill delivers the pipe at an increased or decreased rate due to some change in operating conditions, as when for example hotter or colder skelp is supplied, the timing of the closing of the flag switch is modified accordingly as it then closes either before or after but not simultaneously with cam switch 31 and the circuits controlled by these two switches are so designed that when this occurs speed control motor 25 is energized in the direction appropriate to change the setting of rheostat 21 and thereby either decrease or increase the speed of motor 20 and hence drum switch 15 to lengthen or shorten the interval between successive engagements of clutch 9.

More specifically a relay 53 provided with normally open contacts 53', 53'' is so connected that when switch 31 closes first and while relay 52 is deenergized due to switch 30 remaining open, relay 53 is actuated to close said contacts and current then flows through motor 25 and its series field 59 in the direction to move rheostat 21 for decreasing the speed of motor 20. This relay 53 may therefore be referred to as the "longer" relay since the effect of decreasing the speed of motor 20 is to prolong the time interval between successive engagements of clutch 9 and thus permit a greater length of pipe to pass from the mill between successive cuts, in other words, to cause a section of pipe longer than the preceding one to be severed by the saw on its next and succeeding cycles of operation.

When the flag switch later closes as a result of contact of the end of a pipe section with it, relay 52 is energized to shift contacts 52', 52'' and thereby deenergize relay 53 which consequently interrupts the circuit energizing motor 25; motor 20 thereafter continues to operate at its new speed, corresponding to the new setting of rheostat 21 until the latter is again shifted.

Motor 25 is preferably a constant speed one although subject to manual control by a rheostat 62 in series with its shunt field 63 which is always energized through switches 45 when the system is operating, and it will be apparent the extent to which motor 25 varies the setting of rheostat 21 and hence the speed of motor 20 is related to the extent of departure from the proper length of the pipe section being cut since this factor directly controls the time interval between the operation of cam switch 31 and flag switch 30, there being of course no such interval when the section is exactly the proper length as these two switches then close simultaneously.

When the pipe section severed by the saw is longer than it should be flag switch 30 closes before cam switch 31, thereby energizing a "shorter" relay 65, which thereupon closes its contacts 65', 65'' to energize motor 25 with opposite polarity and so drive it in the reverse direction from that in which it is driven when the longer relay 53 is energized; as is obvious from Fig. 4 the polarity of the terminals of series field 59 and shunt field 63 remains always the same while that of the motor armature is reversible, depending on whether it is energized through the contacts of longer relay 53 or shorter relay 65.

Other instrumentalities indicated in Fig. 4 desirably provided but not essential to the practice of the invention include a delayed action relay 66 whose single normally closed contact 66' forms part of the circuit energizing shorter relay 65 when flag switch 30 closes before cam switch 31; the sole function of this relay 66 is to prevent establishment of a circuit through shorter relay 65 if for any reason flag switch 30 should remain closed after one pipe section has passed it before the succeeding one has reached it and after cam switch 31 has opened. This condition arises rarely, if at all, and relay 66 is therefore a mere safety device to avoid the effects of possible improper operation of flag switch 30.

Manual switches 70, 71, conveniently of the push button type, are indicated in circuits respectively energizing relays 53 and 65 and are provided to enable the operator to effect manual as distinguished from automatic changes in the speed of motor 20 by operating motor 25 in one direction or the other. The switches usually are employed only to make estimated corrections to accommodate the apparatus to a shift in the position of flag switch 30 such as occurs when it is desired to produce, for example, 30' sections after the apparatus has been previously set to cut 20' ones.

Referring now more directly to the effects of the functioning of the various instrumentalities and circuits heretofore described, it will be assumed the mill is beginning operation and it is desired to produce pipe sections of a predetermined length, say 20', after the pipe is issuing from the mill at its normal speed, for example 600' per minute. The operator first closes line switches 44, 45 and 41 to energize the system and start motor 20, then by manipulation of push button switches 70, 71 he can set rheostat 21 to a position corresponding to the estimated proper speed for motor 20, flag switch 30 being set along the conveyor at exactly 20' from the point at which the saw under normal conditions first attacks the pipe and cam switch 31 adjusted to close just as this contact is made. Thereafter upon each revolution of drum switch 15 driven by motor 20 the drum switch contacts 15' close and clutch 9 is engaged to rotate shaft 8 through one complete revolution and thus carry the saw through one cycle of its operation, each cycle ending with the saw retracted and the table at rest at the right hand end of its path as in Fig. 1. As soon as the clutch is engaged the saw table carrying the rotating saw starts to move toward the left in Fig. 1 and very soon thereafter as the table attains the speed of the pipe the saw moves in toward the pipe path and attacks the pipe. At this moment switch 31 is closed by cam 32 and if rheostat 21 has been properly set so the speed of motor 20 corresponds exactly to the speed of issuance of the pipe from the mill, the leading end of the pipe engages and closes flag switch 30 simultaneously with the closing of switch 31 and the armature and series field of motor 25 remain deenergized.

If, however, rheostat 21 has been set to drive motor 20 too fast, so clutch 9 is engaged to bring the saw into contact with the pipe at a point less than 20' from its end, cam 32 causes switch 31 to close before the pipe end can reach and close flag switch 30. As before explained, upon the closing of cam switch 31 before flag switch 30 closes motor 25 is energized to adjust the rheostat to slow down the operation of drum switch 15, and although the section immediately being cut is then shorter than 20' the adjustment of the rheostat insures that the succeeding one will be longer; if flag switch 30 closes almost immediately after cam switch 31, as is the case when the section being cut is nearly as long as it should be, motor 25 operates only for a short time, for of course only a small adjustment of rheostat 21 is required. If this interval is longer, however, motor 25 operates for a greater period and thus makes a larger adjustment of the rheostat so as to cause a correspondingly longer section to be cut on the succeeding cycle, but the speeds of the various instrumentalities are desirably proportioned so that motor 25 cannot normally over-compensate for a single persistent change in the pipe speed, for example so as to cause the succeeding section to be cut longer than 20'. Preferably the ratio of the various speeds is such as to provide more or less gradual compensation for a change in the pipe speed, whereby when one section is materially shorter than desired the next may be only a little too short, the change of pipe speed not being fully compensated until the third or even some later section. Each succeeding section thus progressively approaches nearer the proper length until when it is attained switches 30, 31 close simultaneously, motor 25 remains deenergized, and motor 20 thereafter continues to operate at constant speed until the pipe speed again changes, thereby necessitating further compensation.

Conversely, whenever the speed of the pipe becomes greater than that to which the then speed of drum switch 15 corresponds a pipe section is produced that is too long; flag switch 30 therefore closes before cam switch 31 and motor 25 thereupon operates in the proper direction to increase the speed of the drum switch and bring the system again into synchronism to produce sections of the desired length substantially in the same way as when the sections are too short, the functions of the shorter relay and of cam switch 31 in interrupting its effect at the appropriate instant being apparent from what has heretofore been said.

It will of course be understood that once the ideal conditions have been attained, theoretically no further action on the part of the system should be required, at least until sections of another length are to be cut or a change in the mill speed is designedly made. As has been suggested, however, many unforeseeable factors not under the control of the operator can and often do affect the speed at which the pipe is delivered by the forming mechanism of the mill, as for example changes in the thickness or temperature of the skelp delivered to the latter or even spontaneously occurring changes in the condition of the mill itself, and it is in compensating for their effects that the present invention finds its primary usefulness.

I have herein more particularly referred to use of my system in controlling the length of pipe sections cut by a flying saw carried by a saw table arranged to travel periodically along a rectilinear path and to return along the same path to starting position after a cut has been made, but it will be apparent the system may be equally well employed in association with saw carrying mechanism partaking of oscillatory or pendulum-like motion in opposite directions, or periodic motion of revolution along a closed path about a center. Terms suggesting reciprocation of the saw table consequently are intended to include such other motions as well, saws of the pendulum and the rotating or turntable type being familiar to the industry, and the employment of my system for controlling their operation will therefore be obvious from what already has been said.

Moreover it will be apparent that to sever the pipe a relative motion between it and the saw is all that is required and consequently the pipe may equally well be moved against the rotating saw transversely of its own path, as by a movable section in the runout table, the action of course being correlated with the movement of the saw supporting mechanism in substantially the same manner as when the saw is moved toward the pipe, and since mechanisms adapted for this purpose are well known in the art they require no description or illustration as their specific construction forms no part of the invention.

While I have herein described one embodiment of my invention which is well adapted for attainment of the object of the latter, I do not thereby desire or intend to restrict or confine myself specifically thereto as many changes can be made in the design, construction and arrangement of the mechanical and electrical instrumentalities employed and in the circuits by which the latter are controlled and actuated without departing from the spirit and scope of the invention as defined in the appended claims.

Having thus described my invention, I claim and desire to protect by Letters Patent of the United States:

1. A control system for a flying saw assembly adapted to cut into sections an elongated object traveling along a rectilinear path including means for reciprocating the saw in directions generally parallel to said path, comprising continuously operating switch means for intermittently actuating said reciprocating means, and means controlling the speed of said continuously operating switch means to thereby control the frequency of the movements of the saw in correspondence to the rate of movement of the object.

2. A control system for a flying saw assembly adapted to cut into sections an elongated object traveling along a rectilinear path including means for reciprocating the saw in directions generally parallel to said path, comprising continuously operating switch means for intermittently actuating said reciprocating means, means controlling the speed of said continuously operating switch means to thereby control the frequency of the movements of the saw in correspondence to the rate of movement of the object, and a switch adapted for actuation by successive leading ends of the object after severance by the saw for energizing said controlling means when the saw moving means do not operate in synchronism with the movement of said object.

3. A control system for a flying saw assembly adapted to cut into sections an elongated object traveling along a recilinear path including means for reciprocating the saw in directions generally parallel to said path, comprising continuously operating switch means for controlling said means, and means adapted to be actuated by successive leading ends of the object after they are formed by the saw for controlling the speed of said continuously operating switch means.

4. A control system for a flying saw assembly adapted to cut into sections an elongated object traveling along a rectilinear path including means for reciprocating the saw in directions generally parallel to said path, comprising continuously operating means for intermittently actuating said reciprocating means, means controlling the speed of said continuously operating means to thereby control the frequency of the movements of the saw in correspondence to the rate of movement of the object, a switch disposed in said path adapted for actuation by successive leading ends of the object after severance by the saw, and another switch actuated by said saw reciprocating means, said switches being respectively oppositely individually operative to change the speed of said continuously operating means and adapted when actuated simultaneously to maintain said speed substantially constant.

5. In a control system for a flying saw assembly adapted to cut into sections an elongated object traveling along a rectilinear path including mechanical means for activating the saw to move it along the path substantially at the speed of the object, transversely into said path and to then return it to starting position, and electrically controlled means for intermittently actuating said mechanical means, a continuously operated switch adapted to periodically successively close and open a circuit including said electrically controlled means, a variable speed motor for driving said switch, means for controlling the speed of said motor, a reversible motor operative to actuate said speed controlling means, a switch mechanically interconnected with said saw activating means controlling the reversible motor circuit to drive the reversible motor in one direction, a flag switch positioned for engagement by the object controlling the reversible motor circuit to drive the reversible motor in the opposite direction, and means interposed in said circuits operative to maintain the reversible motor deenergized when said last mentioned switches are actuated simultaneously.

6. Apparatus for controlling an intermittently activated flying saw adapted to cut into successive sections a continuously generated elongated object, comprising means including a mechanically actuated switch for intermittently activating the saw; a variable speed motor for driving said switch, and means controlling the speed of said motor including a rheostat in the motor energizing circuit, a reversible motor for operating the rheostat selectively in opposite directions, switches controlling the reversible motor energizing circuits for energizing said motor respectively in opposite directions, means controlled by each switch for deenergizing the reversible motor circuit controlled by the other switch, and means respectively actuated by the saw activating means and by the successive leading ends of the object for operating said last mentioned switches whereby either reversible motor energizing circuit when completed upon the closing of its controlling switch is interrupted upon subsequent closing of the other switch.

7. In a control system for a flying saw assembly adapted to cut sections consecutively from a continuously generated elongated object including a switch operative to cause the saw to perform a cutting cycle, continuously operating means for periodically closing and opening the switch, means for controlling the speed of said continuously operating means and switches respectively actuated by the saw activating means and by the successive leading ends of the object independently operative to energize said speed controlling means respectively in opposite directions, each of said last mentioned switches being operative when actuated after actuation of the other to interrupt the speed controlling means energizing circuit theretofore completed by said other switch.

8. In a control system for a flying saw assembly adapted to cut sections consecutively from a continuously generated elongated object including a switch operative to cause the saw to perform a cutting cycle, continuously operating means for periodically closing and opening the switch, means for controlling the speed of said continuously operating means, switches respectively actuated by the saw activating means and by the successive leading ends of the object independently operative to energize said speed controlling means respectively in opposite directions, and means for maintaining said speed controlling means inactive when said switches are actuated simultaneously.

9. In flying saw activating mechanism control means, a switch operative to intermittently close and open a circuit, variable speed means for actuating the switch continuously, means for controlling the speed of said switch actuating means, and means responsive respectively to the position of the saw and the position of the object being cut thereby independently operative to change said speed in opposite directions and simultaneously operative mutually to neutralize each other against such change.

10. In control system for a flying saw assembly adapted to cut consecutive sections from a continuously generated elongated moving object and including a reciprocable saw table, a saw, and means operable to reciprocate the table, continuously rotating means adapted to actuate said last mentioned means periodically whereby to cause the saw to sever the object into sections of substantially equal length when the object is being generated at a predetermined speed, and means automatically operative to change the rate of rotation of the continuously rotating means in correspondence with changes in the rate of generation of the object to thereby vary the timing of attack of the saw upon the latter.

11. In a control system for a flying saw assembly adapted to cut consecutive sections from a continuously generated elongated moving object and including a reciprocable saw table, a saw, and means operable to reciprocate the table, continuously rotating means adapted to actuate said last mentioned means periodically whereby to cause the saw to sever the object into sections of substantially equal length when the object is being generated at a predetermined speed, and electrically actuated means including a switch actuated by the front end of the object operative to automatically increase the rate of rotation of the continuously rotating means upon an increase in the rate of generation of the object and thereby accelerate the period of each cutting cycle and the timing of attack of the saw upon the object.

12. In a control system for a flying saw assembly adapted to cut consecutive sections from a continuously generated elongated moving object and including a reciprocable saw table, a saw, and means operable to reciprocate the table, continuously rotating control means adapted to actuate said last mentioned means periodically whereby to cause the saw to sever the object into sections of substantially equal length when the object is being generated at a predetermined speed, and means including a switch mechanically actuated from said table reciprocating means operative to automatically decrease the rate of rotation of the control means upon a decrease in the rate of generation of the object and thereby decelerate the period of each cutting cycle and the timing of attack of the saw upon the object.

13. In a control system for a flying saw assembly adapted to cut consecutive sections from a continuously generated elongated moving object and including a reciprocable saw table, a saw, and means operable to reciprocate the table, a variable speed motor, a switch continuously driven thereby adapted to control the timing of attack of the saw upon the object to sever it into sections of substantially equal length when it is being generated at constant speed, and means operative to automatically change the speed of the motor to alter the time of attack of the saw upon the object upon a change in its speed of generation and thereby maintain the length of sections cut subsequently to said change in speed of generation substantially equal to those cut prior thereto.

LELAND R. MANSELL.

REFERENCES CITED

The following references are of record in the file of this patent:

UNITED STATES PATENTS

| Number | Name | Date |
|---|---|---|
| 1,862,354 | Winne | June 7, 1932 |
| 1,946,926 | Barton | Feb. 13, 1934 |
| 2,079,974 | Trant | May 11, 1937 |
| 2,211,362 | Bennett | Aug. 13, 1940 |
| 2,341,870 | Johnston | Feb. 15, 1944 |
| 2,395,562 | Mansell | Feb. 26, 1946 |